United States Patent Office 2,874,188
Patented Feb. 17, 1959

2,874,188
PHARMACEUTICALS

Dominic D. Micucci, Havertown, and Souren Avakian and Robert R. Brendel, Oreland, and Gustav J. Martin, Philadelphia, Pa., assignors to The National Drug Company, Philadelphia, Pa., a corporation of Delaware No Drawing. Application March 28, 1957
Serial No. 649,013

3 Claims. (Cl. 260—558)

This invention relates to and has for its object the provision of a novel series of chemical compounds and methods for their preparation, the compounds being useful as medicinals which affect the central nervous system and yield hypnotic or sedative effects. This application is a continuation-in-part of Serial No. 539,678, filed October 10, 1955, and now abandoned, which in turn is a continuation-in-part of Serial No. 398,428, filed December 15, 1953, now abandoned.

The compounds of the invention are those having the general formula

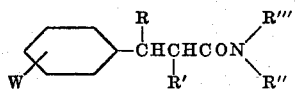

wherein W is preferably hydrogen or halogen (e. g. chlorine, bromine, iodine and fluorine) but also may be lower alkyl (e. g. methyl ethyl, isopropyl, etc.) or lower alkoxy (e. g. methoxy, ethoxy, propoxy, etc.); R is hydrogen or lower alkyl (e. g. methyl, ethyl, isopropyl, etc.); R' is allyl; R" is hydrogen, lower alkyl, lower alkenyl (preferably allyl) or aryl-lower alkyl; and R''' is hydrogen, lower alkyl, lower alkenyl (preferably allyl), or aryl-lower alkyl. Preferred are those compounds containing at east one ethylenically unsaturated allyl group. Especially preferred are those compounds in which R is hydrogen or methyl and R' is allyl.

These compounds may be prepared by condensing the desired hydrocarbon halide (R'X) with the desired dialkylmalonate (or an alkyl acetoacetate) in an anhydrous organic medium, such as an alcohol (e. g. ethanol, isopropanol, etc.) or toluene, in the presence of equimolar amounts of an alkali metal, an alkali metal alkoxide, or an alkali metal hydride. The resulting product is then condensed with an alpha-phenylalkyl halide

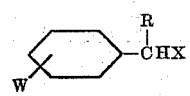

in a similar manner. The resulting ester is then hydrolyzed to the free diacid, which is in turn decarboxylated to the monoacid. This product is converted to the acid halide by means of a halogenating agent such as SOCl₂, PCl₃ or PCl₅, and the acid halide is treated with the desired secondary amine to form the final product. This series of steps is graphically illustrated below (R, R', R", R''' and W having the same meanings as above).

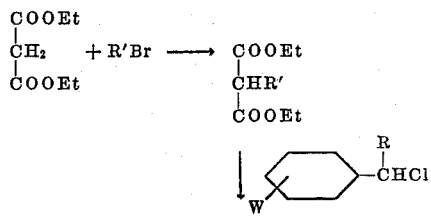

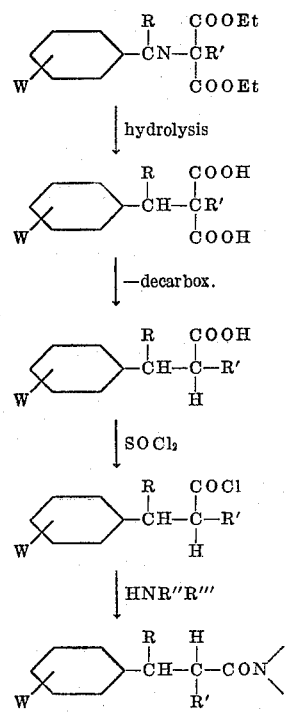

Where the R group in the alpha-phenylalkyl halide is other than hydrogen, the hydrocarbon halide (R'X) must be reacted with the dialkyl-malonate prior to the condensation with the alpha-phenylalkyl halide when the reaction is carried out in alcohol. In toluene, however, these alkylation steps may be carried out in either order. This is possible because, in toluene, for instance, MeOH formed from the reaction of NaOMe and alpha-phenylalkylmalonic ester is distilled out, hence, shifting the equilibrium:

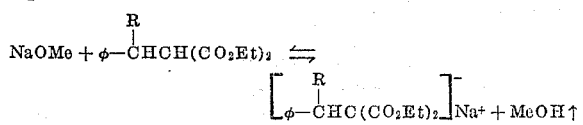

to the right eliminating the predominant R'X+NaOMe reaction.

In the cases where the substituents in the molecule are such that the carbon atoms alpha and beta to the carboxamide group are both asymmetric centers and different, then there exist two isomeric dl pairs which may be separated by fractional crystallization.

Although it is desirable to use stoichiometric quantities of the reactants in the condensation, considerable variation is possible in each step. Likewise, other reaction conditions such as temperature, pressure and the inert solvents which are utilized, may be varied within wide limitations.

The compounds of the invention may be incorporated in the usual manner for ingestion, preferably by the oral route. Thus, the compounds may be tabletted or encapsulated; and, if desired, they may be made into suspensions, elixirs or other such liquid form. The dosage which is utilized will vary with the particular patient being treated. The dosage unit forms may, therefore, be conveniently made up to contain about 50–200 mg. (preferably about 50 mg.) per dosage unit of the active ingredient in lactose as the excipient or in 10% ethanol as the diluent, e. g. tablet, capsule. Tablets may, of course, be scored to provide for further fractional dosages.

Following are working examples presented as illustrative of the invention. However, these examples are not in any way limitative and cannot be construed as any restriction on the invention.

*Example 1*

A solution of 20.9 g. allylbenzylacetylchloride in 50 ml. anhydrous ethyl ether is added dropwise to a stirred solution of 16 g. diethylamine in 200 ml. anhydrous ethyl ether. The reaction mixture is stirred for 2 hours, allowed to stand over night and then filtered. The filtrate is washed several times with water, dried over anhydrous $Na_2SO_4$ and distilled. The N,N-diethylallylbenzylacetamide, B. P.$_{0.7}$ 115–117° amounted to about 18 g.

*Examples 2–11*

Following the procedures of Example 1 and substituting the equivalent reactants for those used in the reference example, the following compounds are prepared. The acetyl halide reactant used is preferably acetylchloride; however, any other acetyl halide, in equivalent stoichiometric amounts, may be substituted, particularly the acetylbromide. Thus, for example, allylbenzylacetylbromide may be substituted for the corresponding chloride.

This invention may be variously otherwise embodied within the scope of the appended claims.

We claim:

1. Compounds of the group consisting of those having the general formula:

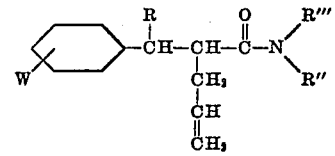

wherein W is a member of the group consisting of hydrogen, halogen, methyl and methoxy; R is a member of the group consisting of hydrogen, lower alkyl; and R" and R''' are members of the group consisting of hydrogen, lower alkyl, lower alkenyl and aryl-lower alkyl radicals.

2. Alpha-allyl-alpha-benzylacetamide.
3. Alpha-allyl-alpha-(alpha-phenylethy)-acetamide.

|    | R      | R'           | R"           | R'''              | B. P./mm.    | M. P., degrees |
|----|--------|--------------|--------------|-------------------|--------------|----------------|
| 2  | H      | CH₂=CHCH₂—   | CH₂=CHCH₂—   | CH₂=CHCH₂—        | 125–7°/0.5   |                |
| 3  | H      | CH₂=CHCH₂—   | CH₃CH₂—      | (CH₃CH₂)NC=O  CH₂  CH₂ | 118–192°/0.5 |          |
| 4  | H      | CH₂=CHCH₂—   | CH₃—         | φCH₂—             | 169–173°/0.7 |                |
| 5  | H      | CH₂=CHCH₂—   | H            | φCH₂—             |              | 71–72          |
| 6  | H      | CH₂=CHCH₂—   | φCH₂—        | φCH₂—             |              | 76–77          |
| 7  | H      | CH₂=CHCH₂—   | CH₃CH₂—      | CH₃CH₂—           | 122–124°/0.8 |                |
| 8  | CH₃—   | CH₂=CHCH₂—   | CH₃CH₂—      | CH₃CH₂—           | 125–127°/0.8 |                |
| 9  | CH₃—   | CH₂=CHCH₂—   | CH₂=CHCH₂—   | CH₂=CHCH₂—        | 134–136°/0.5 |                |
| 10 | CH₃—   | CH₂=CHCH₂—   | H            | CH₂—              | 129–130°/0.5 |                |
| 11 | CH₃—   | CH₂=CHCH₂—   | CH₃—         | CH₃—              | 106–107°/0.5 |                |

*Examples 12–20*

Following the procedures of Example 2, the following compounds are prepared, covered by the structural formula:

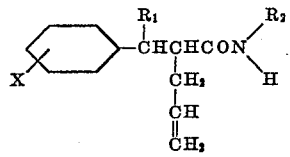

| No. | R₁        | R₂ | X      | M. P., °C. | B. P./mm. |
|-----|-----------|----|--------|------------|-----------|
| 12  | H         | H  | p—CH₃O | 100–101    |           |
| 13  | H         | H  | o—CH₃  | 73–74      |           |
| 14  | H         | H  | p—Cl   | 123–124    |           |
| 15  | H         | H  | p—F    | 83–84      |           |
| 16  | CH₃       | H  | o—CH₃O | 92–93      |           |
| 17  | CH₃       | H  | p—CH₃  | 133–134    |           |
| 18  | CH₃       | H  | p—Cl   | 107–108    |           |
| 19  | CH₃CH₂—   | H  | H      | 111–112    |           |
| 20  | (CH₃)₂CH₂—| H  | H      | 87–88      |           |

References Cited in the file of this patent

UNITED STATES PATENTS

| 2,413,493 | Flisik et al. | Dec. 31, 1946 |
| 2,459,706 | King | Jan. 18, 1949 |

FOREIGN PATENTS

| 256,756 | Germany | Feb. 20, 1913 |
| 7,591 | Great Britain | Nov. 16, 1911 |
| 368,590 | Great Britain | Mar. 10, 1932 |

OTHER REFERENCES

J. A. C. S., vol. 60, pp. 465–467 (1938).
J. A. C. S., vol. 72, pp. 1488–1489 (1950).
Jour. Chem. Soc. (London), pp. 2750–2758 (1926).
J. Prak. Chem., vol. 71, pp. 311 and 316 (1905).
Ramart: "Annales des Chemie," vol. 8, series 10 (1927), pp. 268 and 272.
Beilstein's Handbook Org. Chem., 4th ed., vol. 9, 2nd suppl., page 421 (1949).